US012600831B2

(12) United States Patent
Zatirakha et al.

(10) Patent No.: US 12,600,831 B2
(45) Date of Patent: Apr. 14, 2026

(54) LATEX HYPERBRANCHED ANION EXCHANGERS

(71) Applicant: DIONEX CORPORATION, Sunnyvale, CA (US)

(72) Inventors: Aleksandra Zatirakha, San Jose, CA (US); Christopher A. Pohl, Union City, CA (US)

(73) Assignee: Dionex Corporation, Sunnyvale, CA (US)

( * ) Notice: Subject to any disclaimer, the term of this patent is extended or adjusted under 35 U.S.C. 154(b) by 665 days.

(21) Appl. No.: 18/147,458

(22) Filed: Dec. 28, 2022

(65) Prior Publication Data

US 2024/0218137 A1 Jul. 4, 2024

(51) Int. Cl.
*C08J 5/22* (2006.01)
*C08J 3/12* (2006.01)

(52) U.S. Cl.
CPC ............... *C08J 5/2243* (2013.01); *C08J 3/12* (2013.01); *C08J 2321/02* (2013.01); *C08J 2325/10* (2013.01); *C08J 2329/04* (2013.01)

(58) Field of Classification Search
USPC ........................................................... 521/25
See application file for complete search history.

(56) References Cited

U.S. PATENT DOCUMENTS 4,351,909 A 9/1982 Stevens
4,359,537 A * 11/1982 Chong .................. B01J 47/018 977/788
7,291,395 B2 * 11/2007 Pohl .................. B01J 20/28042 428/407
9,283,494 B2 3/2016 Pohl
2021/0388199 A1 12/2021 Kodemura

FOREIGN PATENT DOCUMENTS

EP 0 058 358 A1 5/1982

OTHER PUBLICATIONS

Lamb et al., "A systematic study of the effect of macrocycle ring size and donor atom type on the log K, .DELTA.H, and T.DELTA.S of reactions at 25.degree.C. in methanol of mono- and divalent cations with crown ethers" Journal of the American Chemical Society, 1980, vol. 102, No. 2, pp. 475-479.

* cited by examiner

*Primary Examiner* — Fred M Teskin

(57) ABSTRACT

A method for making modified latex particles, wherein the particles comprise condensation polymers bonded to functional groups on the latex particles and the method for forming the condensation polymer comprises reacting the amino groups present on the latex particles with (i) at least a first polyfunctional compound, having at least two functional moieties reactive with said functional groups of the latex, or (ii) at least a first polyfunctional compound, having at least two functional moieties reactive with said functional groups of the latex and at least a first amine compound, comprising amino groups selected from the group consisting of ammonia, a primary and a secondary amine to form a first condensation polymer reaction product comprising ion exchanging sites and a first unreacted excess of functional moieties.

32 Claims, 2 Drawing Sheets

LATEX HYPERBRANCHED ANION EXCHANGERS

FIELD OF THE INVENTION

The present invention relates to ion exchange packing material based on latex particles suitable for use in chromatography medium and methods of making thereof.

BACKGROUND OF THE INVENTION

Ion chromatography has been a powerful technique for the determination of various inorganic and organic ions. However, providing an anion exchanger that has both high efficiency and selectivity together with stability in highly alkaline media required for the separation of anions still poses challenges.

This is because the separation provided by anion exchangers is dependent on the various parameters, including the substrate type, particle size, size distribution, hydrophilicity of the stationary phase, water content of the stationary phase and packing procedures.

There is therefore a need for stable ion-exchange material that provides both high efficiency and selectivity.

Latex-agglomerated anion exchangers, such as those described in EP0058358A1 provide high performance. However, the capacity of the latex particles is limited by the fixed size and composition of the latex, with typically not more than 2 amino groups able to be utilised per latex functionality.

Hyperbranched anion exchangers comprising sulfonated substrate and bonded hyperbranched condensation polymer, such as those described in C. Pohl, C. Saini, New developments in the preparation of anion exchange media based on hyperbranched condensation polymers, J. Chromatogr. A1213 (2008) 37-44, also provide high performance. However, a large number of reaction cycles are required in order to increase capacity, which results in high crosslinking degree affecting stationary phase selectivity.

The listing or discussion of an apparently prior-published document in this specification should not necessarily be taken as an acknowledgement that the document is part of the state of the art or is common general knowledge.

As chromatographic selectivity is not only affected by the characteristics of the substrate, but is also dependent on the structure of the functional layer, it would be advantageous to provide new ion-exchange materials using a new combination of substrate and hyperbranched layers to provide additional options for ion separation.

SUMMARY OF THE INVENTION

The present invention seeks to solve at least some of the above issues by seeking to combine features from each of the above substrates to provide new and highly effective ion-exchange materials.

Thus, the present invention provides a method for making modified latex particles, wherein the particles comprise condensation polymers bonded to functional groups (in particular amino and/or hydroxyl functional groups) on the latex particles and the method for forming the condensation polymer comprises:

(a) reacting the functional groups present on the latex particles with:
  (i) at least a first polyfunctional compound, having at least two functional moieties reactive with said functional groups, or
  (ii) at least a first polyfunctional compound, having at least two functional moieties reactive with said functional groups and at least a first amine compound, comprising amino groups selected from the group consisting of ammonia, a primary and a secondary amine to form a first condensation polymer reaction product (CPRP) comprising ion exchanging sites and a first unreacted excess of functional moieties.

Typically, in the method of making modified latex particles, the condensation polymers are bonded to functional groups, where at least some of the functional groups are located on the surface of the latex particles.

In the method for making modified latex particles, the where the functional groups are amino groups, the amino groups on the latex particles are preferably primary and/or secondary or tertiary amine groups.

The term "at least some of the functional groups are located on the surface," as used herein, means that the condensation polymer may be bonded to functional groups located throughout the latex particle but at least some must be bonded to functional groups located on the outer surface of the latex particles. For example, at least 25% of the condensation polymers may be bonded to functional groups on the outer surface of the latex particle, such as at least 50% of the condensation polymers may be bonded to functional groups on the outer surface of the latex particle, or at least 75% of the condensation polymers may be bonded to functional groups on the outer surface of the latex particle.

The functional (i.e. amino and/or hydroxyl) groups on (at least on the outer surface of) the latex particles, for example the primary, secondary and/or tertiary amino groups, may be already present on the latex particles (for example, present after the latex particles have been formed) or may be formed by converting functional groups capable of being converted to an amino group or an hydroxyl group. Examples of functional groups that are capable of being converted into an amino group include those that can be converted via hydrolysis or via reaction with an amine either directly or indirectly into amino groups, i.e. primary, secondary and/or tertiary amine groups.

Methods of forming such latex particles would be well known to the person skilled in the art.

The amino groups may be singular or multifunctional, that is the amino group may comprise a single primary, secondary or tertiary amine group or may comprise more than one primary, secondary or tertiary amine group, such as two or three primary, secondary or tertiary amine groups.

As used herein, "a functional group capable of being converted to an amino group by hydrolysis" is intended to include groups that being subjected to acidic or basic media provide a primary, secondary or tertiary amino group. For example, an amide group.

As used herein, "a functional group capable of being converted to an amino group via reaction with an amine either directly or indirectly" is intended to include groups that when reacted with an amine form a primary, secondary or tertiary amino group. For example, through nucleophilic substitution of haloalkanes, epoxide ring opening or reductive amination.

The at least two functional moieties of the at least a first polyfunctional compound may include at least one functional moiety selected from the group consisting of epoxides, alkyl halides, benzyl halides, tosylates, methyl sulphides and mixtures thereof. In a preferred aspect, the at least two functional moieties of the at least a first polyfunctional compound may comprise epoxide moieties.

Suitable epoxides include butadiene diepoxide, ethyleneglycol diglycidyl ether, butanediol diglycidyl ether, diethyleneglycol diglycidyl ether, hexanediol diglycidyl ether, glycerol triglycidyl ether and numerous other compounds containing two or more epoxy groups including epoxy resins commonly used in commercial epoxy formulations. Suitable alkyl halides include dichloroethane, dichloropropane, dichlorobutane, dibromoethane, dibromopropane dibromobutane as well as numerous other alkyl halides. Suitable benzylhalides include alpha, alpha-dichloroxylene and alpha, alpha-dibromoxylene as well as numerous other benzylic halides. Suitable tosylates include ethyleneglycolditosylate, diethyleneglycolditosylate as well as tosylates of various other aliphatic or aromatic polyols. Suitable methylsulfides include 1,3-bis(methylthio)propane and 1,4-bis(methylthio)butane as well as numerous other polymethylsulfides. The polyfunctional compounds for the present invention preferably include epoxide polyfunctional moieties defined to include monoepoxide compounds, diepoxide compounds and/or polyepoxide moieties in compounds including polymers.

The size of the polyfunctional compounds may vary over a wide range from simple non-polymeric compounds, e.g., with molecular weights less than 87 to small polymeric compounds with molecular weights of 234 to 10,000. Preferably the polyfunctional compounds are water soluble and consist of glycidyl ethers of polyols or contain glycidyl ethers attached to hydrophilic polymers such as polyethyleneglycol or polypropyleneglycol or are combinations of all three such as glycerol propoxylate triglycidyl ether.

Other polyfunctional reagents capable of forming condensation polymers with either polyfunctional amines or polyfunctional epoxide may also be used in conjunction with or in the place of materials suitable for reacting with amines or materials suitable for reacting with epoxides. Suitable alternative polyfunctional reagents for reacting with polyfunctional amines include 2-methyl-2-nitro-1,3-propanediol, dithiobis(succinimidyl propionate), cyanuric chloride, and polyfunctional acid chlorides such as dimethyl adipimidate dihydrochloride. Suitable alternative polyfunctional reagents for reacting with polyfunctional epoxides include compounds such as polyfunctional thiols. Preferably suitable reagents are also water-soluble in order to facilitate water-based synthesis methods.

The at least a first amine compound comprises an amino group selected from the group consisting of ammonia, a primary and a secondary amine. The at least first amino compound may include additional amine groups and may include both primary and secondary amines as well as tertiary amines.

Suitable amino groups of the primary amine type include methylamine, ethylamine, propylamine, isopropylamine, butylamine, isobutylamine, sec-butylamine, tert-butylamine, amylamine, tert-amylamine, hexylamine, heptylamine, octylamine, benzylamine, phenethylamine, ethanolamine, 3-amino-1-propanol, 1-amino-2-propanol, 2-amino-1-propanol, 2-amino-1,3-propandiol, 4-amino-1-butanol as well as numerous other primary amines either with or without additional polar and/or hydrophilic substituents.

Suitable amino groups of the secondary amine type include dimethylamine, diethylamine, dipropylamine, diisopropylamine, dibutylamine, diisobutylamine, di-sec-butylamine, di-tert-butylamine, di-tert-amylamine, dipentylamine, dihexylamine, diethanolamine, methylethanolamine, ethylethanolamine, morpholine as well as numerous other secondary amines either with or without additional polar and/or hydrophilic substituents.

Suitable amine compounds include aliphatic diamines such as ethylenediamine, 1,3-diaminopropane, 1,2-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, 1,2-diaminocyclohexane, 1,4-diaminocyclohexane, aromatic benzylic diamines such as m-xylylenediamine,p-xylylenediamine, aliphatic polyamines such as diethylenetriamine, triethylenetetramine and higher polymeric analogues as well as a variety of other structures containing multiple primary, secondary and/or tertiary amine groups in a single compound.

Both the primary and secondary amines are polyfunctional in nature in that they each include at least two functional groups which can react with the polyfunctional groups to form a CPRP as will be described hereinafter. The size of the amine compounds may vary over a wide range from simple non-polymeric compounds, e.g., with molecular weights ranging from 17 to small polymeric compounds with molecular weights of 200 to 10,000. Preferably, each amino group in the amine compounds should have at least three atoms in the link between each amino group in order to achieve good reactivity for each amino group but polymeric species such as polyethyleneimine and polyamines derived from the hydrolysis of n-vinylformamide polymers are also useful in the present invention.

In step (a) of the method for making modified latex particles, the functional (i.e. amino and/or hydroxyl) groups present on the latex particles are reacted with (i) at least a first polyfunctional compound, having at least two functional moieties reactive with said functional groups, or (ii) at least a first polyfunctional compound, having at least two functional moieties reactive with said functional groups and at least a first amine compound, comprising amino groups selected from the group consisting of ammonia, a primary and a secondary amine to form a first condensation polymer reaction product comprising ion exchanging sites and a first unreacted excess of functional moieties.

The reaction in step (a) is performed to provide an excess of unreacted (and therefore reactive) functional moieties. These may be unreacted moieties on the polyfunctional compound or unreacted moieties on the amine compound in the first CPRP. By "unreacted" it is meant that one or more of the functional moieties is unreacted, for example has not taken part in a condensation reaction and is therefore still reactive.

The reaction in step (a) also provides ion-exchanging sites, at least on the outer surface of the latex. By the term "ion-exchanging sites" we mean functional groups present on the condensation polymer that have a positive or negative charge, depending on the desired use. For example, quaternary ammonium sites on the condensation polymer on at least the outer surface of the latex.

In step (a) a large excess of the at least first polyfunctional compound or at least a first polyfunctional compound and at least a first amine compound may be used.

The compounds used in step (a) may include the first amine compound as the only amine compound and the first polyfunctional compound as the only polyfunctional compound. Alternatively, it can include mixtures of the first amine compound with one or more additional amine compounds. Further, it can include the first polyfunctional compound alone with the first or additional amine compounds or may include a mixture of the first polyfunctional compound and one or more additional polyfunctional compounds. In this way, each condensation polymer reaction product may be tailored to include the desired functions.

Further, the amino groups in each amine compound and the two functional moieties in the polyfunctional compounds may be the same or different from each other. For example, the first amine compound may include at least only a primary amine group, only a secondary amine group, one or more primary and/or secondary groups, or the like. Similarly, the first polyfunctional compound may include the at least two functional moieties reactive with the amino groups which are of the same type or a different type, and may include, in addition, more than two functional moieties.

Successive CPRPs may be formed after step (a) by reacting the unreacted excess of functional moieties of the first CPRP with further polyfunctional compound and/or amine compound. The compound used to form the subsequent CPRPs will depend on the unreactive moieties present on the previous CPRP. For example, if the first CPRP is formed via step (a) (i), then the subsequent CPRP may be formed using an excess of amine compound or an excess of both polyfunctional compound and amine compound. Alternatively, if the first CPRP is formed by step (a) (ii), then the subsequent CPRP may be formed using an excess of polyfunctional compound or an excess of both polyfunctional compound and amine compound.

Thus, the method defined above may further comprise step (b) (i) or (b) (ii), wherein in step (b) (i) the unreacted excess of functional moieties on the CPRP of step (a) (i) may be reacted with at least a second amine compound or both at least a second polyfunctional compound and at least a second amine compound to form a second CPRP comprising ion exchanging sites and a second unreacted excess of functional moieties; and in step (b) (ii) the unreacted excess of functional moieties on the CPRP of step (a) (ii) may be reacted with at least a second polyfunctional compound or both at least a second polyfunctional compound and at least a second amine compound to form a second comprising ion exchanging sites and a second unreacted excess of functional moieties.

In this way, the polyfunctional compound and amine compound may be added sequentially or in one pot to form the successive CPRPs.

This process can be repeated as many times as desired to accomplish desired properties to the end product.

Thus, the method may further comprise reacting a further amine compound and/or polyfunctional compound with unreacted excess amine compound moieties or polyfunctional compound moieties from the first or second condensation polymer reaction product in step (a) or (b).

Referring to step (b) (i) or (ii), and any subsequent repetitions if present, the at least second amine compound or second polyfunctional compound may be characterized in an analogous manner to the first amine compound and first polyfunctional compound. Thus, the second amine compound may be in a mixture with one or more additional amine compounds and may comprise one or more primary and/or secondary amine groups in the second amine compound.

It should be noted that the terms "second amine compound" and "second polyfunctional compound" in step (b) (i) or (ii), are used to show that step (b) (i) or (ii) occurs after step (a). However, the meaning of the term "second amine compound" encompasses an amine compound which is the same as or different from the first amine compound. Similarly, the term "second polyfunctional compound" encompasses a second polyfunctional compound which is the same as or different from the first polyfunctional compound.

As noted above, at any time in the above process, the outside layer of condensation polymer reaction products on the latex particles have ion-exchanging sites, such as the cation functionality of the amine groups. The product of this reaction may be used directly in this form without further modification. In this case, the product of this reaction will contain both strong base anion exchange sites and weak base anion exchange sites which can be advantageous for some separations.

However, strong base anion exchange sites may be introduced into the outside layer of the condensation polymer through a capping reaction by reacting with a capping compound comprising a tertiary amine group. In this manner, the reaction is capped or terminated and the ion exchange coating includes a greatly increased number of quaternary amines conventionally used for the separation of anions, as when the substrate is used in the form of anion exchange packing for a chromatography column or the like.

The condensation polymers on the latex particles may be converted to be used as a cation exchange substrate by reacting excess amine reactive functional groups on the exterior surface of the coated substrate with amine containing cation functional compounds. Suitable amine containing cation functional groups include sulfonic acid, phosphonic acid and carboxylic acid or combinations thereof. Preferably, suitable amine containing cation functional compounds include two or more cation functional groups such that the total number of cation functional groups exceeds the number of previously formed anion exchange sites. Suitable compounds include: γ-Carboxyglutamic acid, Nitrilotriacetic acid, 3,3',3"-Nitrilotripropionic Acid, N-(2-Carboxyethyl) iminodiacetic acid, N-(Phosphonomethyl)glycine, 2-Amino-3-phosphonopropionic acid, Iminodi(methylphosphonic acid), 2-Aminoethylphosphonic acid, Piperazine-1,4-bis(2-ethanesulfonic acid), Homocysteic acid and 2-Amino-3-sulfopropionic acid, as well as numerous other amine containing cation functional compounds. Other suitable cation functional groups include sulfonic acid, phosphonic acid and carboxylic acid. Other suitable cation functional compounds include: chloroacetic acid, bromoacetic acid, chloropropionic acid, bromopropionic acid, sodium 2-chloroethanesulfonate, sodium 2-bromoethanesulfonate or 1,4-Butane sultone. Phosphonic acid cation functional groups can be introduced using suitable reagents such as phosphorouspentachloride or phosphorous oxybromide followed by hydrolysis.

One or more of the condensation polymer functional groups may be branched and/or cross-linked. For example, the second, third or higher CPRP s can be branched and cross-linked by appropriate choice of reagents and by choice of reagents and by adjustment of the ratios of reagents and excesses of one or the other of the amine compounds and polyfunctional compounds as set forth hereinafter.

For example, the "second CPRP" of step (b) (i) or (ii) may be prepared using a mixture of polyfunctional amine and polyfunctional epoxide compounds. The composition of this layer may be adjusted so that the mixture will not produce a gel under the conditions of application of the "second CPRP." For example, methylamine (a trifunctional amine capable of reacting with a total of three epoxy groups, forming a quaternary ion exchange site) is preferably combined with a water-soluble diepoxide (a difunctional epoxide), in a preferred embodiment butanediol diglycidyl ether. If these two ingredients are combined in the ratio of two moles of methylamine to three moles of butanediol diglycidyl ether, they tend to form a cross-linked gel since they are combined together in a stoichiometry complementing of their functionality. Such a reaction mixture in either the slurry mode or a flow-through "packed column" mode may be undesirable in that in the former case gelation would result in substrate particles suspended in a stable gel unsuitable for use in liquid chromatography and in the latter case would result in the development of extremely high pressures, precluding the use of pumping as a means of delivering the reagent, rendering the material unsuitable for use in liquid chromatography. If instead, the ratio of the two reagents is adjusted so that a gel does not form (preferably using a composition close to that capable of gelation without using a composition capable of gelation), the solution can be passed through the "packed column" without experiencing a high pressure characteristic of gelation. Furthermore, the coating thickness will continue to increase as this solution is passed through the column.

Useful "CPRP coatings", such as the first and/or second and/or subsequent CPRP coatings, can be achieved by using a 1:1 mole ratio of the preferred reagents while allowing the reagents to react in the presence of the product of step (a) or (b) for one hour at 65° C. Using this composition allows formation of a largely linear CPRP on the product of step (a) or the product of step (b) (i) or (b) (ii) if subsequent CPRPs are being formed.

The condensation polymer(s) formed with this composition contain a significant number of ion-exchange sites (i.e. reactive amines sites) because under these conditions the amine reactant is in excess in terms of the functionality of the reagent.

For example, when combining methylamine (a trifunctional reagent) and butanediol diglycidyl ether (a difunctional reagent) in a 1:1 ratio, a polymer will be formed with on average two butanediol diglycidyl ether reagents attached to each methylamine reagent forming a largely linear polymer with the resulting polymer being primarily an alternating polymer with amine and butanediol diglycidyl ether groups alternating in the polymer chain. The majority of all amine groups thus formed being tertiary at the completion of the "CPRP" preparation step although some of the amine groups at this point will be quaternary and some of the amine groups will be secondary. These tertiary amine groups (as well as the secondary amine groups) are still available for further reaction, forming quaternary sites at each reaction site. Accordingly, the "CPRP", such as the "first CPRP" or the "second CPRP" is accessible for subsequent treatment with polyfunctional epoxides.

In an aspect of the method for making modified latex particles, the latex may be allowed to react with a large excess (e.g., 50 to 200%) of polyfunctional epoxide (polyfunctional compound), preferably butanediol diglycidyl ether. By utilizing a large excess of polyfunctional epoxide, the latex is now decorated with pendant unreacted epoxide groups. Following treatment with a large excess (e.g., 50 to 200%) of polyfunctional epoxide, the substrate may then be treated with a large excess of polyfunctional amine (amine compound), preferably methylamine. This leaves the surface decorated with pendant groups containing amine functionality with two residual reactive sites.

Repeating the cycle of using a large excess of polyfunctional epoxide followed by a large excess of polyfunctional amine will result in branch points at every amine with a quaternary site at the branch points. Theoretically, making use of butanediol diglycidyl ether and methylamine and alternating reactions, will result in a doubling of the number branches with each layer. By utilizing this method very high capacities can be achieved by repeating the cycle a suitable number of times (e.g., at least 3, 4, 5, 6, 7, 8 or more times). In practice, the situation is significantly more complex than this because as branching increases the probability of branches becoming cross-linked together also increases. Accordingly, materials produced using the preferred embodiment will tend to have an increasing amount of cross-link as the number of cycles increases (assuming at least 1 of the reagents utilized has a functionality>2). However, if layers are alternated with both a difunctional amine and a difunctional epoxide, chain propagation will be predominantly linear and cross-linking side reactions will be greatly diminished.

An additional possible complication in this reaction chemistry is the tendency for epoxides to undergo base catalyzed polymerization. Since condensation polymers using this synthesis strategy will be in the hydroxide form, they can under some conditions induce polymerization of the polyfunctional epoxy monomer in the absence of any amine. The final condensation polymer likely contains a fraction of polyepoxide formed via this polymerization side reaction which also decorates the surface. The presence of these additional reaction pathways does not by itself limit the utility of the current method as the examples provided in the attachment coated demonstrate. Useful compositions can be created by varying the different combinations including changing the nature of either the amine or the epoxide or both in each layer or by making use of combinations of either amines or epoxides in each layer.

An epoxy monomer may be used to produce hydroxide selective materials. Hydroxide selectivity requires hydroxyl functional groups located near the quaternary centre of each anion exchange site.

Epoxy monomers provide such hydroxyl groups as a by-product of the reaction of epoxides with amines. Accordingly, such condensation polymers are particularly useful for making hydroxide selectivity anion exchange phases. However, this does not limit the utility of the invention to epoxy monomers and amines. In fact, analogous condensation polymers can also be produced using for example polyfunctional alkyl halides in conjunction with polyfunctional amines. Such condensation polymers will not be hydroxide selective but will still be useful for preparation of anion exchange phases.

Although, as mentioned above, conditions leading to gel formation are generally to be avoided, especially in the case of slurry grafting, useful synthesis methods include use of combinations which ultimately lead to gel formation by simply reducing exposure time of the substrate to the reaction mixture such that the exposure time is less than the gelation time of the reaction mixture.

Therefore, the method defined above may comprise forming the first, second or subsequent condensation polymers in a flow-through chamber by sequentially flowing (i) said at least a first polyfunctional compound, or (ii) said at least a first polyfunctional compound and at least a first amine compound, past the latex particles or the first, second or subsequent condensation polymer reaction product.

This may enable a large quantity of latex particles to be packed in a bed and coated in a large flow-through column and removed in large quantities as a supply for packed smaller analytical columns.

Although the method of the invention may utilize methylamine, as set forth above a wide variety of alternative polyfunctional amines are also suitable for the present invention including simple diamines, triamines and higher polyamines. Propagation of polymer growth steps requires that the amine contain at least two available reactions sites. Termination of polymer growth can be accomplished by a final reaction step with tertiary amine containing compounds or the reaction can be ended without such a terminating reaction.

An advantage of the current invention is that when the condensation polymer is applied to a column coated with latex or product of step (a), the coating process can be interrupted for column evaluation, and then the process can be resumed. However, because epoxides are subject to hydrolysis under alkaline conditions, it is generally preferable to interrupt the reaction after reaction with a polyfunctional amine containing reagent rather than immediately after reaction with a polyfunctional epoxy containing reagent. Likewise, although the preferred polyfunctional epoxide is butanediol diglycidyl ether a wide variety of polyfunctional epoxides may be used in the present invention. Ideally the polyfunctional epoxide should be water-soluble to facilitate formation of the condensation polymer under aqueous conditions but any of the numerous polyfunctional epoxides available can be used for this purpose. Furthermore, a wide variety of polyglycidyl reagents not readily available can be readily synthesized using standard synthesis methods. While in-situ column preparation of condensation polymers is a convenient way of quickly evaluating different formulations, in-situ column preparation is generally not as efficient as batch synthesis. However, by making use of either slurry grafting techniques or preferably large packed bed reactors, optimal coating chemistries can easily be transferred to larger scale batch processes.

In general terms, epoxides and amines react as shown below.

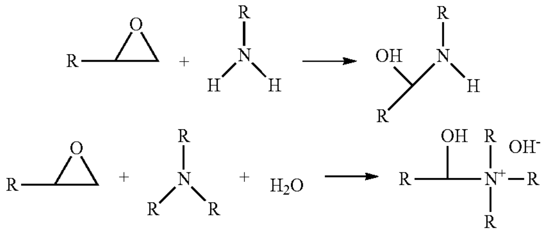

In the method defined previously, the latex particles may have a mean diameter of from about 0.01 to about 0.5 microns.

Typically, the latex particles may comprise styrenic and/or methcrylate-based monomers. For example, the latex particles may comprise polyvinylbenzyl chloride cross-linked with divinylbenzene or ethylene diamine.

As noted previously, the functional groups on the latex particles may be already present on the latex particles or may be formed by converting functional groups capable of being converted to an amino group or hydroxyl group. For example, the latex particles may comprise epoxide functional groups on at least the outer surface of the latex, which can be converted to amino functional groups, for example through reaction with methyl amine.

The modified latex particles defined above may be utilised to provide an ion-exchange chromatography packing material. Therefore, there is also defined a method for making an ion-exchange chromatographic packing material, wherein the method for making the packing material comprises latex particles obtained as defined in the application, wherein the latex particles are:

(i) ionically bonded to support resin having ion-exchanging sites at least on its available surface (hereinafter "available sites) before step (a); or (ii) ionically bonded to support resin having ion-exchanging sites at least (ii) on its available surface (hereinafter "available sites) after the formation of the first, second or subsequent condensation polymer reaction products.

In the method for making an ion-exchange chromatography packing, the support resin may be a synthetic ion-exchange resin.

A wide variety of condensation and addition polymers bearing ion exchanging sites of the form (i.e. anion or cation exchanging) desired are known to the art. These synthetic resins and their preparation are amply described by Wheaton and Hatch in Chapter 6 of "Ion Exchange", Vol. 2, J. Marinsky Ed. (New York 1969). For example, synthetic ion exchange resins such as poly(phenol-formaldehyde), polyacrylic or polymethacrylic acid or nitrile, amine-epichlorohydrin resins, graft polymers of styrene on polyethylene or polypropylene, poly(2-chloromethyl-1,3-butadiene) and particularly poly(vinylaromatic) resins such as those derived from styrene, alpha-methylstyrene, chlorostyrene, chloromethylstyrene, vinyltoluene, vinylnaphthalene or vinylpyridine, all of which resins have been suitably cross-linked to render them insoluble in the solvent media with which they will be contacted and which bear desired ion exchanging sites, are suitable synthetic resins from which support resin may be formed. Synthetic resins employed may be the macroporous type or the gel type resins well known in the art.

The term "available surface," as used herein, means the surface of the support resin that will come into contact with latex particles (as defined herein) when the support resin is contacted with the latex particles, for example, as a suspension of latex particles.

For example, when the support resin is made from beads of a gel type resin, the available surface area will be essentially the outer surface of those beads. When the support resin is from a macroporous resin, the available surface will be both the outer surface of that resin and the inner surface of the minute channels which permeate the structure of the resin and which have pore sizes greater than the particle size of the latex particles.

In a preferred embodiment of the invention, the support resin may comprise about 4 to 10 micron beads of cross-linked poly(vinylaromatic) resin, most preferably a styrene-divinylbenzene copolymer containing about 25 to about 55% divinylbenzene monomer by weight, having anion or cation exchanging sites on their available surface.

The ion-exchanging sites on the support resin typically comprise negatively charged functional groups, preferably sulfonic, carboxylic and/or phosphonic functional groups. For example, the ion-exchanging sites on the available surface of the support resin may be sulfonic groups.

The ion-exchanging sites on the available surface of the support resin may then be utilised to form an (irreversible) ionic bond between ion-exchanging sites, at least on the outer surface of the latex, and sites of opposite charge on the available surface of the support resin.

For example, where the ion-exchanging sites on at least the outer surface of the latex particles are cationic, the ion-exchanging sites on the support resin will be anionic, such as quaternary ammonium sites on the latex particles and sulfonic groups on the support resin.

The support resin may typically be substantially spherical, and/or may have a particle size of from about 2 to about 100 microns, preferably from about 4 to about 10 microns.

The support resin may be insoluble or substantially insoluble in any solvent system with which it may later be used.

In the method of making an ion-exchange chromatographic packing material, the support resin and latex particles, either before step (a) or after the formation of the necessary condensation polymer reaction products, are mixed/combined together. This may be performed in a conventional ion-exchange column in-situ by slurrying the support resin in a nonsolvent liquid, packing this slurry in the ion-exchange column and then passing the suspension of latex particles through the column. By continuously monitoring the column effluent stream for breakthrough of latex particles, the completion of formation of the latex particles may be determined once substantially all of the support resin available sites have been attached by latex particles.

When the latex particles have been (irreversibly) attached to the support resin, the combination may be washed with suitable quantities of the nonsolvent liquid to remove excess latex particles. The ion exchange packing material is then ready for operation and may be used without further treatment. Where desired the ion exchange composition may be separated from the liquid, drained and dried at room temperature, for the purposes of storage, transportation and the like.

Through the methods defined herein, the present invention also provides modified latex particles, wherein the latex particles comprise:

(i) A first condensation reaction polymer product comprising ion exchanging sites and a first unreacted excess of functional moieties, wherein the first condensation reaction polymer is formed by reacting functional groups (i.e. amino and/or hydroxyl) on the latex particles with:
   i. At least a first polyfunctional compound having at least two functional moieties; or
   ii. At least a first polyfunctional compound having at least two functional moieties and at least a first amine compound, comprising amino groups selected from the group consisting of ammonia, a primary and a secondary amine.

Finally, the invention provides an ion-exchange chromatographic packing material comprising:

(i) Support resin having ion-exchange sites at least on its available surface; and
(ii) Modified latex particles as defined in the application, wherein an ionic attraction is formed between the ion exchanging sites on the support resin and ion exchanging sites on the latex particles.

The modified latex particles may have the further features as defined in the method of making modified latex particles defined herein.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

For the avoidance of doubt, in this specification when we use the term "comprising" or "comprises" we mean that the methods or products being described must contain the listed components but may optionally contain additional components. Comprising should be considered to include the terms "consisting of" or "consists of" where the methods or products being described must contain the listed component(s) only.

For the avoidance of doubt, preferences, options, particular features and the like indicated for a given aspect, feature or parameter of the invention should, unless the context indicates otherwise, be regarded as having been disclosed in combination with any and all other preferences, options particular features and the like as indicated for the same or other aspects, features and parameters of the invention.

The term "about" as used herein, e.g. when referring to a measurable value (such as an amount or parameter), refers to variations of +20%, +10%, +5%, +1%, +0.5%, or, particularly, +0.1% of the specified amount.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

The invention will now be described by reference to the following, non-limiting, Figures and Examples.

In order to illustrate the present invention, the following non-limited examples of its practice are given

Example 1

10 g of latex based on vinylbenzene chloride (VBC) and divinylbenzene (DVB) was mixed with 3.1 g of 40% solution of methylamine (MA) and 6.9 g of deionized water and left to react for 4 h at 65° C. Glacial acetic acid was then added to the aminated latex until pH 5 was reached. The resulting sulfonated ethylvinylbenzene-dilvinylbenzene substrate particles with 55% crosslink, average diameter of 6.45 µm and surface area of 20 m2/g were then packed into 4×250 mm column and prepared latex was passed through the column.

Figure 1:
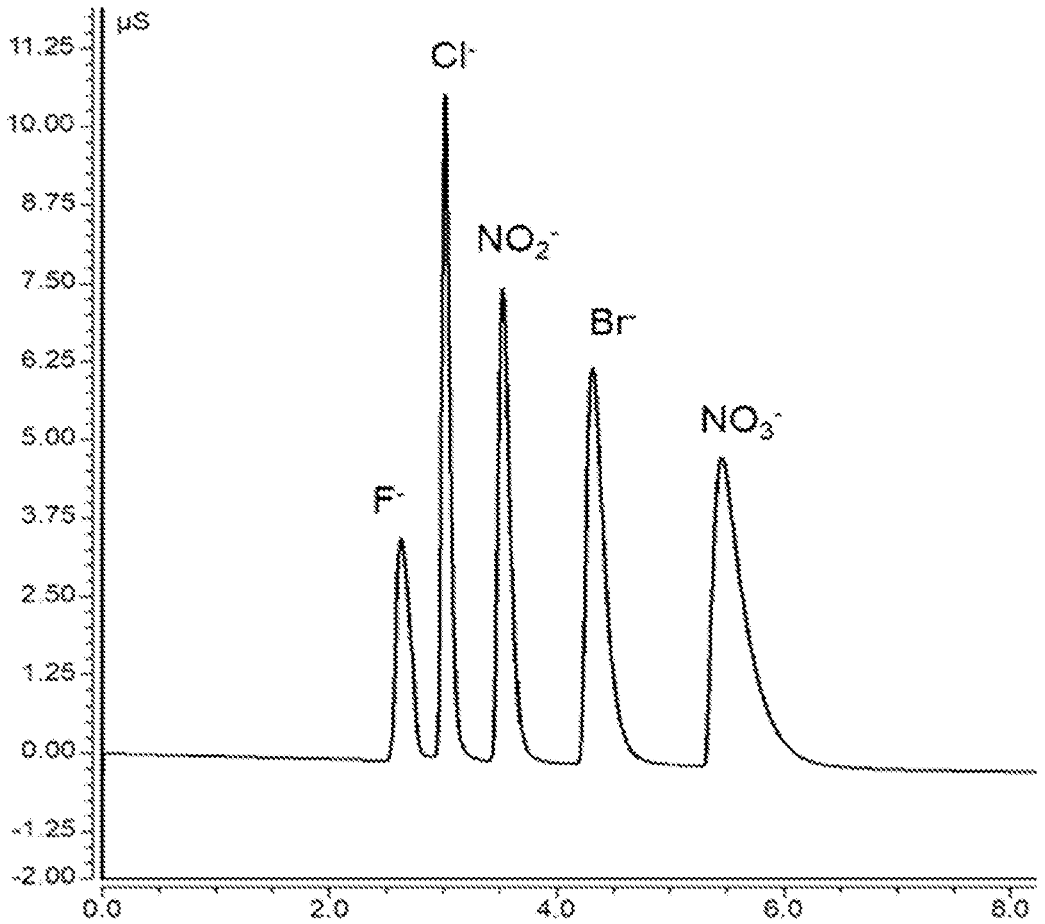
FIG. 1: Shows a chromatogram of the separation of inorganic anions using ion chromatography packing formed by the method of the invention comprising sulfonated EVB-DVB as the substrate, vinylbenzyl chloride-based latex and 1 cycle of hyperbranching using methylamine (4% solution in water) and 1,4-butanediol diglycidyl ether (10% solution in water).

The hyperbranched layer on top of the latex was formed by using the following procedure to run one reaction cycle: passing a 10% solution of 1,4-butanediol diglycidyl ether for 20 min through the column with the flow rate of 0.25 mL/min, allowing it to react in the column for 40 min; rinsing the column with deionized water for 10 min, passing a 4% solution of methylamine through the column for 20 min, allowing it to react for 40 min and rinsing the column with deionized water for 10 min. The column was then rinsed with 10 mM KOH. The chromatogram of the separation of some monovalent inorganic anions in suppressed ion chromatography mode with prepared column using 10 mM KOH as eluent with a flow of 1 mL/min is presented in FIG. 1.

Example 2

Figure 2:
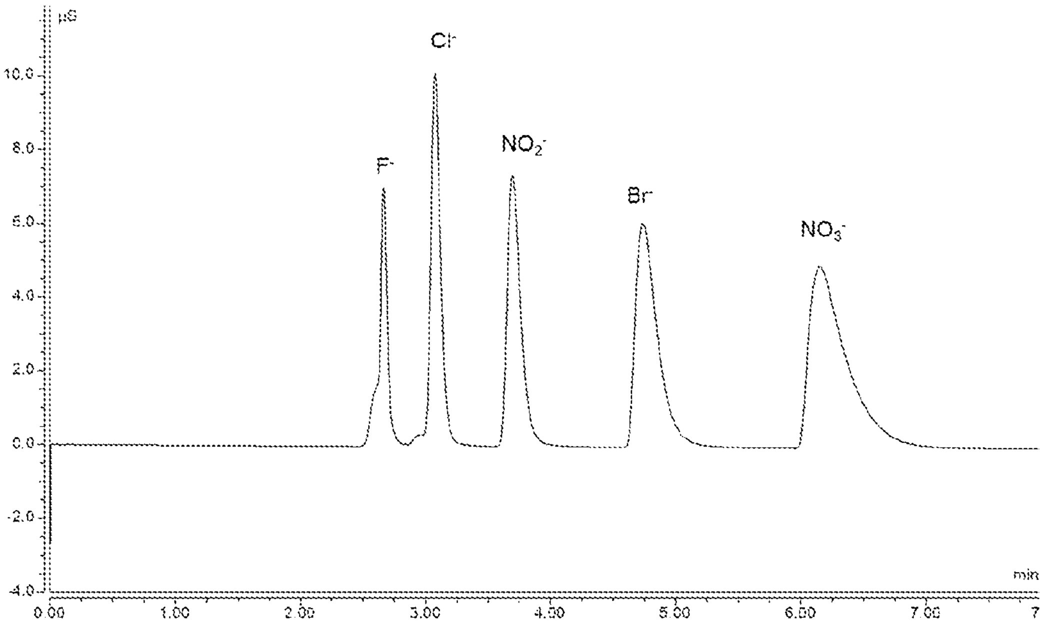
FIG. 2: Shows a chromatogram of the separation of inorganic anions using ion chromatography packing formed by the method of the invention comprising sulfonated EVB-DVB as the substrate, vinylbenzyl chloride-based latex and 2 cycles of hyperbranching using methylamine (4% solution in water) and 1,4-butanediol diglycidyl ether (10% solution in water).

Same as Example 1, but number of reaction cycles in hyperbranching process was 2. The chromatogram of the separation of some monovalent inorganic anions in suppressed ion chromatography mode with prepared column using 20 mM KOH as eluent with a flow of 1 mL/min is presented in FIG. 2.

Example 3

10 g of latex based on vinylbenzene chloride (VBC) and divinylbenzene (DVB) was placed into scintillation vial.

Solution 1 containing 9 g of 40% dimethylamine (DMA) in 20 g of deionized waster and solution 2 containing 14.7 g of 1,4-butanediol diglycidyl ether in 20 g of deionized water were added simultaneously to the latex with a flow of 0.25 mL/min each at 65° C. while stirring. The process was run for 40 min, then the reaction mixture was kept in the oven for 2 h at 65° C. The prepared latex with bonded polymer chains was passed through 4×250 mm column packed with sulfonated ethylvinylbenzene-dilvinylbenzene substrate particles with 55% crosslink, average diameter of 6.45 μm and surface area of 20 m2/g. Column is rinsed with 10 mM KOH.

Figure 3:
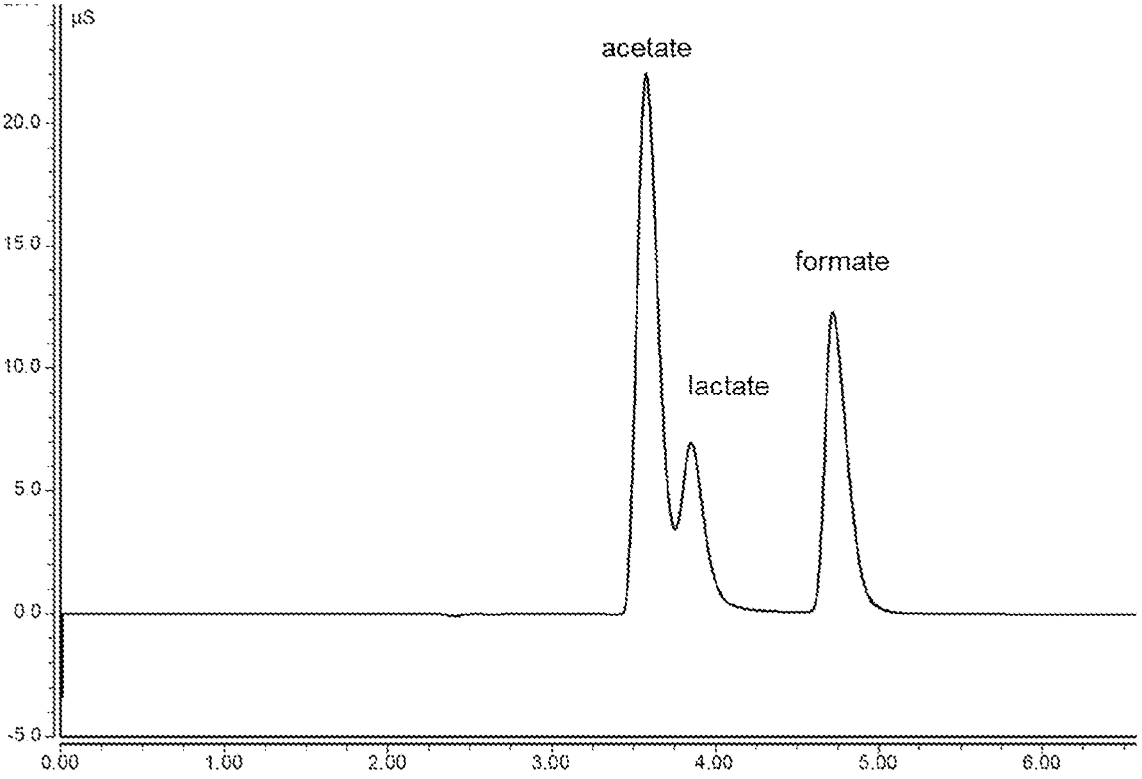
FIG. 3: Shows a chromatogram of the separation of small organic acids using ion chromatography packing formed by the method of the invention comprising sulfonated EVB-DVB as the substrate, vinylbenzyl chloride-based latex as well as dimethylamine and 1,4-butanediol diglycidyl ether for forming condensation polymer.

The chromatogram of the separation of some small organic acids in suppressed ion chromatography mode with prepared column using 20 mM KOH as eluent with a flow of 1 mL/min is presented in FIG. 3.

Example 4

Electrostatically bonded basement layer was prepared according to the U.S. Pat. No. 7,291,395 (4.5 g of sulfonated ethylvinylbenzene-dilvinylbenzene substrate particles with 55% crosslink, average diameter of 6.45 μm and surface area of 20 m2/g were placed into a scintillation vial; 0.368 g of 1.4-butanediol diglycidyl ether, 3.277 g of water, and 1.5 g of 4% methylamine was added to the substrate and mixed well. The mixture was then placed in the tumbler in a 65° C. oven for 2 h, then removed from the oven and cooled for 10-15 min. 6 g of deionized water are added to the vial, mixed and the slurry is packed into 4×250 mm column). A reaction cycle described in Example 1 for forming hyperbranched layer was run 3 times on the basement coating. The capacity of such column is comparable to the latex-based one prepared in Example 1 using only 1 reaction cycle, which shows that attachment of hyperbranched layer to the latex allows one to prepare higher capacity columns with a fewer number of steps.

The invention claimed is:

1. A method for making modified latex particles, wherein the particles comprise condensation polymers bonded to functional groups on the latex particles and the method for forming the condensation polymer comprises:

(a) reacting the functional groups present on the latex particles with:
  (i) at least a first polyfunctional compound, having at least two functional moieties reactive with said functional groups of the latex, or
  (ii) at least a first polyfunctional compound, having at least two functional moieties reactive with said functional groups of the latex and at least a first amine compound, comprising amino groups selected from the group consisting of ammonia, a primary and a secondary amine to form a first condensation polymer reaction product (CPRP) comprising ion exchanging sites and a first unreacted excess of functional moieties.

2. A method according to claim 1, wherein the functional groups on the latex particles are primary and/or secondary or tertiary amino groups or hydroxyl groups.

3. The method according to claim 1, wherein the at least two functional moieties of the at least a first polyfunctional compound include at least one functional moiety selected from the group consisting of epoxides, alkyl halides, benzyl halides, tosylates, methyl sulphides and mixtures thereof.

4. The method according to claim 3, wherein the at least two functional moieties of the at least a first polyfunctional compound comprise epoxide moieties.

5. The method according to claim 1, wherein the method further comprises step (b) (i) or (b) (ii), wherein in step (b) (i) the unreacted excess of functional moieties on the CPRP of step (a) (i) may be reacted with at least a second amine compound or both at least a second polyfunctional compound and at least a second amine compound to form a second CPRP; and in step (b) (ii) the unreacted excess of functional moieties on the CPRP of step (a) (ii) may be reacted with at least a second polyfunctional compound or both at least a second polyfunctional compound and at least a second amine compound to form a second CPRP.

6. The method according to claim 5, further comprising reacting a further amine compound and/or polyfunctional compound with unreacted excess amine compound moieties or polyfunctional compound moieties from the first or second CPRP in step (a) or (b).

7. The method of claim 5 further comprising repeating step (b) (i) or (b) (ii) at least one more time and reacting amine reactive functional moieties on the exterior condensation polymer reaction product with an amine containing cation functional compounds to convert the latex to a cation-exchange material.

8. The method according to claim 7, in which the first, second or subsequent condensation polymers includes functional groups which are cross-linked.

9. The method according to claim 7, in which the first, second or subsequent condensation polymers includes functional groups comprising branched polymer chains.

10. The method according to claim 7, in which step for forming the first, second or subsequent condensation polymers is performed in a flow-through chamber by sequentially flowing (i) said at least a first polyfunctional compound, or (ii) said at least a first polyfunctional compound and at least a first amine compound, past the latex particles or the first, second or subsequent condensation polymer reaction product.

11. The method according to claim 1, wherein the latex particles have a mean diameter of from about 0.01 to about 0.5 microns.

12. The method according to claim 1, wherein the latex particles comprise styrenic and/or methacrylate-based monomers.

13. Modified latex particles wherein the latex particles comprise:

(i) A first condensation reaction polymer product (CPRP) comprising ion exchanging sites and a first unreacted excess of functional moieties, wherein the first condensation reaction polymer is formed by reacting functional groups on the latex particles with:

i. At least a first polyfunctional compound having at least two functional moieties; or ii. At least a first polyfunctional compound having at least two functional moieties and at least a first amine compound, comprising amino groups selected from the group consisting of ammonia, a primary and a secondary amine.

14. The modified latex of claim 13, wherein the particles have a median diameter of from about 0.01 to about 0.5 microns.

15. The modified latex particles of claim 13, wherein the modified latex particles comprise styrenic or methacrylate-based monomers.

16. The modified latex particles according to claim 13, wherein the two functional moieties of said polyfunctional compound include at least one functional moiety selected from the group consisting of epoxide, alkyl halides, benzylhalides, tosylates, methylsulfides, and mixtures thereof.

17. The modified latex particles according to claim 13, wherein at least one of said two functional moieties of the polyfunctional compounds comprise epoxide moieties.

18. The modified latex particles according to claim 13, wherein the unreacted excess of functional moieties on the first CPRP may be (i) reacted with at least a second amine compound or both at least a second polyfunctional compound and at least a second amine compound to form a second CPRP or (ii) may be reacted with at least a second polyfunctional compound or both at least a second polyfunctional compound and at least a second amine compound to form a second CPRP comprising ion exchanging sites.

19. The modified latex particles according to claim 13, further comprising a second CPRP wherein the second condensation reaction polymer is formed by reacting functional moieties on the first CPRP with:

i. at least a second polyfunctional compound having at least two functional moieties; or ii. at least a second polyfunctional compound having at least two functional moieties and at least a second amine compound, comprising amino groups selected from the group consisting of ammonia, a primary and a secondary amine; and wherein amine reactive functional moieties on the exterior CPRP are reacted with an amine containing cation functional compounds to convert the modified latex particles to a cation exchange substrate.

20. A method for making an ion-exchange chromatographic packing material, wherein the method for making the packing material comprises making latex particles as defined in claim 13, wherein the latex particles are:

(i) Ionically bonded to a support resin before the formation of the first CPRP; or (ii) ionically bonded to the support resin after the formation of the first CPRP, a second CPRP, or a subsequent CPRP.

21. The method of claim 20, wherein the support resin is a synthetic ion-exchange resin.

22. The method of claim 20, wherein the support resin has a surface comprising an organic polymer.

23. The method according to claim 20, wherein the support resin comprises negatively charged functional groups.

24. The method according to claim 20, wherein the ionic bond is formed between ion-exchanging sites, at least on the outer surface of the latex particles, and sites of opposite charge on the support resin.

25. The method according to claim 20, wherein the support resin is substantially spherical.

26. The method according to claim 20, wherein the support resin has a particle size of from about 2 to about 100 microns.

27. An ion-exchange chromatographic packing material comprising:

(i) Support resin having ion-exchange sites at least on its available surface; and (ii) Modified latex particles as defined in any one of claims

14 to 19, wherein an ionic attraction is formed between the ion exchanging sites on the support resin and ion exchanging sites on the latex particles.

28. The packing material of claim 27, wherein the support resin is substantially spherical.

29. The packing material of claim 27, wherein the support resin has a particle size of from about 2 to about 100 microns.

30. The packing material according to claim 27, wherein the support resin is a synthetic ion exchange resin.

31. The packing material according to claim 27, wherein the support resin has a surface comprising an organic polymer.

32. The packing material according to claim 27, wherein the support resin comprises negatively charged functional groups.

* * * * *